(12) United States Patent
Bellers

(10) Patent No.: US 7,042,945 B2
(45) Date of Patent: May 9, 2006

(54) 3-D RECURSIVE VECTOR ESTIMATION FOR VIDEO ENHANCEMENT

(76) Inventor: Erwin B. Bellers, 7 Salem La., South Salem, NY (US) 10590

( * ) Notice: Subject to any disclaimer, the term of this patent is extended or adjusted under 35 U.S.C. 154(b) by 841 days.

(21) Appl. No.: 09/840,817

(22) Filed: Apr. 24, 2001

(65) Prior Publication Data

US 2002/0181590 A1      Dec. 5, 2002

(51) Int. Cl.
*H04N 7/12*      (2006.01)

(52) U.S. Cl. ................................. 375/240.16

(58) Field of Classification Search ............... 375/240.12–240.16; 382/107, 232, 236, 238; 348/699; H04N 7/12, 7/32
See application file for complete search history.

(56) References Cited

U.S. PATENT DOCUMENTS

| | | | |
|---|---|---|---|
| 6,219,436 B1 * | 4/2001 | De Haan et al. ............ | 382/107 |
| 6,385,245 B1 * | 5/2002 | De Haan et al. ........ | 375/240.16 |
| 6,483,928 B1 * | 11/2002 | Bagni et al. ................ | 382/232 |
| 2002/0025077 A1 * | 2/2002 | De Haan et al. ............ | 382/238 |

OTHER PUBLICATIONS

"Motion Estimation and Compensation" by G. de Haan, pp. 11-22.
"True Motion Estimation with 3-D Recursive Search Block Matching", by G. de Haan et al., IEEE Transactions on Circuits and Systems for Video Technology, vol. 3, No. 5, Oct. 1993, pp. 368-379.
"Sub-Pixel Motion Estimation with 3-D Recursive Search Block-Matching", by G. de Haan et al, Signal Processing Image Communication No. 6, 1994, pp. 229-239.
"Recursive Search Block-Matching", Chapter 4, pp. 101-126.
"Simultaneous Multi-Frame MAP Super-Resolution Video Enhancement using Spatio-Temporal Priors", by S. Borman et al., Department of Electrical Engineering, pp. 469-473, Feb. 1999.
"Simultaneous Recursive Displacement Estimation and Restoration of Noisy-Blurred Image Sequences", by James C. Brailean et al., pp. 1236-1251, Sep. 1995.
G. de Haan, "Motion Estimation and Compensation—An Integrated Approach to Consumer Display Field Rate Conversion," Chapter 4 entitled "Recursive Search Block-Matching," ISBN 90-74445-01-2, Philips Research Labs, the Netherlands, 1992, pp. 101-126.

* cited by examiner

*Primary Examiner*—Richard Lee
(74) *Attorney, Agent, or Firm*—Larry Liberchuk

(57) ABSTRACT

A video signal processor enhancing video information evaluates candidate vectors of enhancement algorithms utilizing an error function biased towards spatio-temporal consistency with a penalty function. The penalty function increases with the distance—both spatial and temporal—of the subject block from the block for which the candidate vector was optimal. Enhancements are therefore gradual across both space and time and the enhanced video information is intrinsically free of perceptible spatio-temporal varying artifacts.

20 Claims, 4 Drawing Sheets

PRIOR ART          PRIOR ART

3-D RECURSIVE VECTOR ESTIMATION FOR VIDEO ENHANCEMENT

This application claims priority under 35 U.S.C. §119(e) to U.S. Provisional Patent Application No. 60/267,256 entitled "3-D Recursive Vector Estimation for Video Enhancement" filed Feb. 3, 2001.

TECHNICAL FIELD OF THE INVENTION

The present invention is directed, in general, to video enhancement systems and, more specifically, to maintaining spatio-temporal consistency during video enhancement.

BACKGROUND OF THE INVENTION

Many contemporary high performance televisions, particularly large screen and wide screen versions, utilize a spatial-temporal resolution which is higher than the normal resolution and refresh rate. For example, a 100 Hertz (Hz) screen refresh rate may be employed for the television display rather than the standard 50 or 60 Hertz. However, because the field rate—the number of interlaced screen images or "fields" for the television—within the program signal received will typically be only 50 fields per second, the number of fields for display must be doubled.

For digital televisions employing a field memory—a memory with the capacity to store a digitized version of a complete television field—one technique for doubling the field rate involves simply writing to the field memory at a first rate and reading from the field memory at a second rate which is double the first rate. However, such field rate up-conversion by simple field repetition results in each movement phase (i.e., frame) being displayed multiple times, with moving objects appearing slightly displaced from their expected spatio-temporal (space-time) position in the repeated movement phases as illustrated in FIG. 5.

The space-time positioning 501a, 501b and 501c of an object moving linearly across the screen within a sequence of three fields n−2, n−1 and n is shown in FIG. 5. Field rate up-conversion by field repetition produces inter-mediate fields (not labeled) in which the space-time positioning of the object is 503a, 503b and 503c rather than the expected space-time positioning of 502a, 502b, and 502c.

While the displacement is almost unnoticeable to the human eye at video information captured at normal field rates (50–60 Hz) employed by video cameras and the like, motion picture cameras have, for historical electro-mechanical reasons, operated at a capture rate of 24 frames per second. While modern motion picture cameras have been improved, much film exists which was recorded at that previously-standard capture rate. Such film is normally converted for television display by running the film at approximately 25 frames per second and then scanning each frame twice such that adjacent pairs of identical fields are created within the video information.

When up-converting a television formatted motion picture to a higher field rate utilizing simple field repetition, the already duplicated fields are again duplicated, creating sequences of four identical fields within the video information and resulting in a significant amount of motion jitter and picture blurring. To address these problems, motion compensation techniques such as three dimensional (3-D) recursive search block matching have been developed to provide motion-compensated interpolation. See, for example, G. de Haan, *Motion Estimation and Compensation—An Integrated Approach to Consumer Display Field Rate Conversion* (ISBN 90-74445-01-2) and G. de Haan et al, "True-Motion Estimation with 3-D Recursive Search Block Matching," *IEEE Tr. On Circuits and Systems for Video Technology*, 3(5):368–379 (October 1993).

High definition television (HDTV) often imposes a requirement differing from—and either in addition to or in lieu of—field rate up-conversion: image resolution enhancement. As illustrated in FIGS. 6A and 6B, image resolution enhancement requires up-conversion from one resolution and the corresponding pixel size 601a and/or pixel density 602a to a higher resolution having a smaller pixel size 601b and/or greater pixel density 602b. Known interpolation techniques are employed to generate the additional pixels required from the original video information.

As known in the art, the shape or magnitude of edges within an image significantly contribute to the overall impression of "sharpness" for the image. Accordingly, various edge enhancement techniques such as frequency peaking and luminance transient improvement (LTI) have been developed for use during image resolution enhancement. Frequency peaking involves linear boosting or "peaking" of selected spatial frequencies within the image, often with a bandpass or highpass filter to enhances the associated spatial frequencies and with adaptive control to avoid "unnaturalness" relating to, for example, peaking large and steep edges. Unlike frequency peaking, luminance transient improvement preserves the magnitude of the edge but increases the steepness of the edge, "pulling" samples near the edge on both sides towards the edge.

Existing edge enhancement algorithms enhance the sharpness of an image based on the spatial information of the original image, often utilizing control parameters determined by a small spatial neighborhood of a given pixel position. While these techniques are generally sufficient for still images, time varying conditions within video information such as (but not limited to) noise, motion, or lighting conditions, or even spatio-temporal varying conditions, may cause annoying artifacts in the processed video information. Conservative tuning of the parameters may prevent such artifacts, but also constrains the enhancement.

There is, therefore, a need in the art for enhancement of video information with spatio-temporal consistency, or consistency of enhanced image data both with spatially surrounding (enhanced) image data in the field containing the enhanced image data and with counterpart or corresponding image data within subsequent fields.

SUMMARY OF THE INVENTION

To address the above-discussed deficiencies of the prior art, it is a primary object of the present invention to provide, for use in a video signal processor, a technique for enhancing video information which evaluates candidate vectors of enhancement algorithms utilizing an error function biased towards spatio-temporal consistency with a penalty function. The penalty function increases with the distance—both spatial and temporal—of the subject block from the block for which the candidate vector was optimal. Enhancements are therefore gradual across both space and time and the enhanced video information is intrinsically free of perceptible artifacts.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
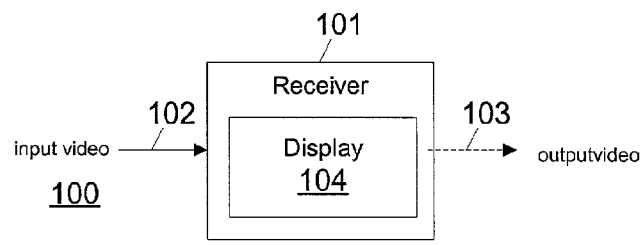
FIG. 1 depicts a system in which video enhancement with spatio-temporal consistency is implemented according to one embodiment of the present invention.

FIG. 1 depicts a system in which video enhancement with spatio-temporal consistency is implemented according to one embodiment of the present invention. System 100 includes a receiver 101, which in the exemplary embodiment is a high definition digital television (HDTV) large-screen or wide-screen television receiver. Alternatively, however, receiver 101 may be an intermediate transceiver or any other device employed to receive or transceive video signals, as for example a transceiver retransmitting video information for reception by a high definition television. In any embodiment, receiver 101 includes a video enhancement mechanism as described in further detail below.

Receiver 101 includes an input 102 for receiving video signals and may optionally include an output 103 for transmitting enhanced video signals to another device. In the exemplary embodiment, receiver 101 includes a high definition television display 104 upon which images rendered or otherwise generated according the enhanced video information are displayed.

Those skilled in the art will perceive that FIG. 1 does not explicitly depict all components within the high definition television receiver of the exemplary embodiment. Only so much of the commonly known construction and operation of a high definition television receiver and the components therein as are unique to the present invention and/or required for an understanding of the present invention are shown and described herein.

Figure 2:
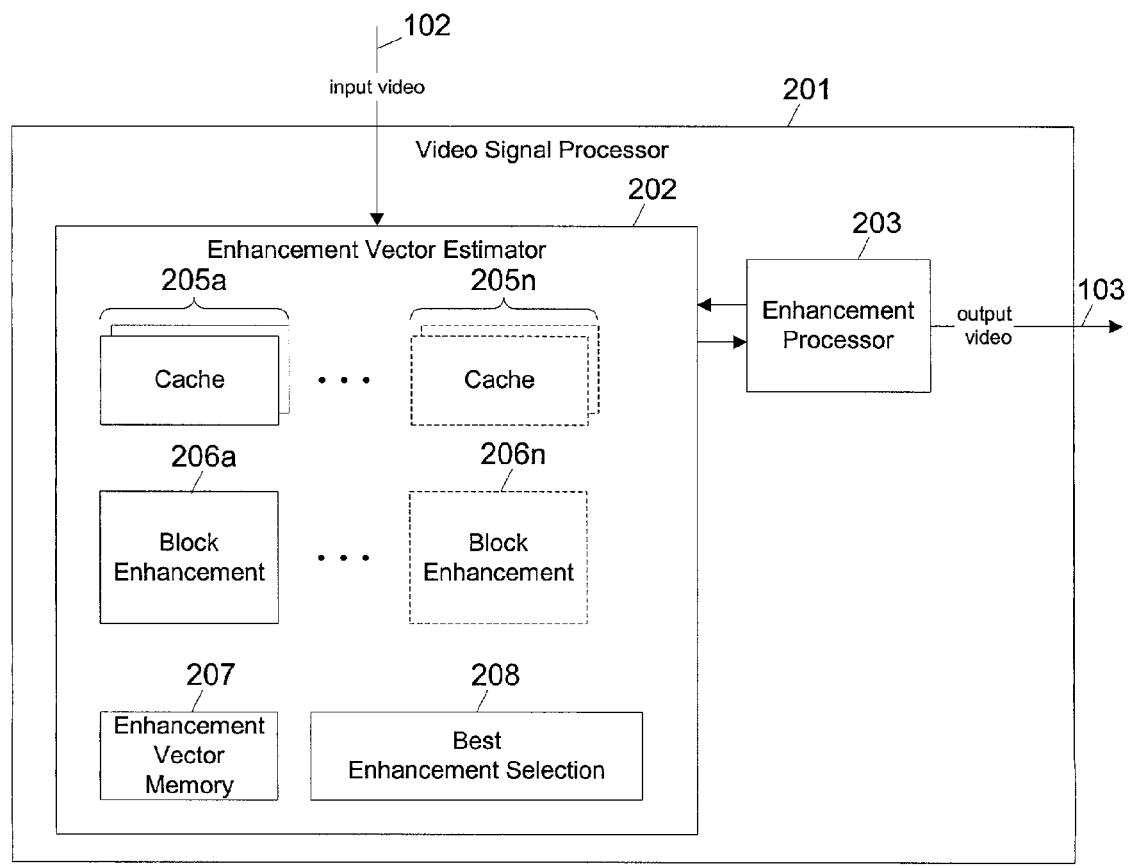
FIG. 2 illustrates in greater detail a system for video enhancement with spatio-temporal consistency according to one embodiment of the present invention.

FIG. 2 illustrates in greater detail a system for video enhancement with spatio-temporal consistency according to one embodiment of the present invention. Receiver 101 includes a video signal processor 201, which may be implemented by a single integrated circuit device or a combination of integrated circuit devices. Video signal processor 201 includes an enhancement vector estimator 202 and enhancement processor 203 which perform the video enhancement processing. Video signal processor 201 in the exemplary embodiment is the device from which the enhanced video output is transmitted either to display 104 or to a storage medium (not shown).

Enhancement processor 203 performs the processing on received video signals required to enhance the video for display. Image or video enhancement is a broad area which may be roughly divided into three categories: restoration of "lost" (image/video) information; elimination of artifacts; and enhancement of selected image/video characteristics. Although the present invention is not limited to any particular category of video enhancement, for the purposes of simplicity resolution enhancement, which falls within the third category, will be utilized to describe and explain the invention. Nonetheless, those skilled in the art will understand that the invention may be readily adapted or extended to video enhancements other than resolution enhancement and falling within any of the three categories listed.

Enhancement processor 203, together with enhancement vector estimator 202 in the exemplary embodiment, performs spatial resolution enhancement on the video information received. The technique for estimation of enhancement vectors according to the present invention is similar to the recursive search block matching motion estimation process described in the references identified above.

To perform video enhancement, enhancement vector estimator 202 includes one or more caches 205a–205n for temporary storage of pixel information relating to processing of a block of pixels, one or more block enhancement units 206a–206n, an enhancement vector memory 207, and a best enhancement selection unit 208 which identifies and selects the best enhancement on a per block basis as described in further detail below.

Figure 3:
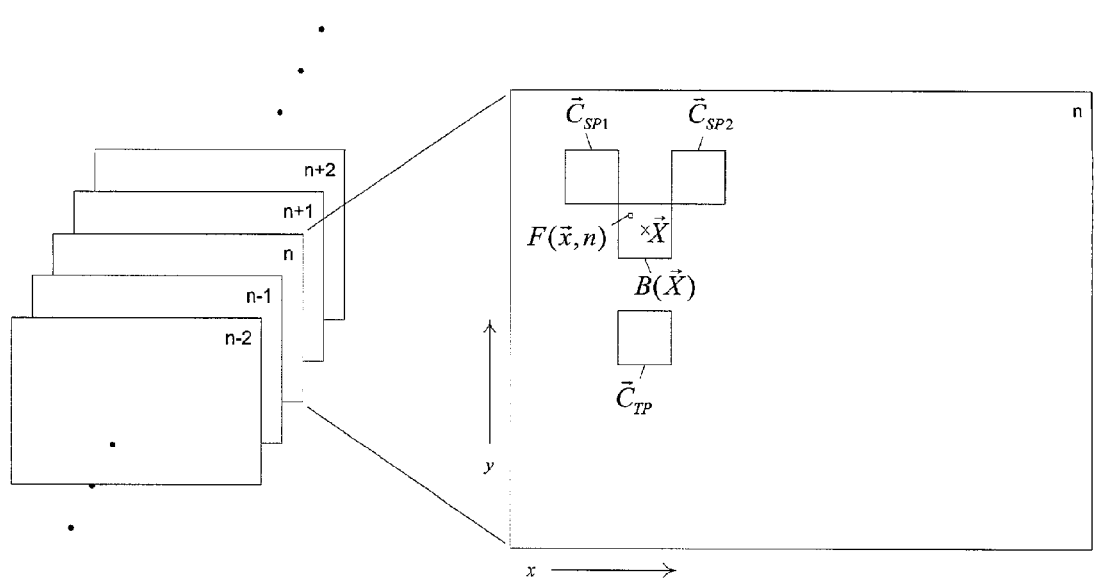
FIG. 3 illustrates a logical organization of video information for video enhancement with spatio-temporal consistency according to one embodiment of the present invention.

FIG. 3 illustrates a logical organization of video information for video enhancement with spatio-temporal consistency according to one embodiment of the present invention. The organization depicted is employed for block enhancement by video signal processor 201 depicted in FIG. 2. The video information to be enhanced includes a plurality of successive pictures (which may be either fields or frames) to be displayed in sequence at a predefined rate. "Successive," as used herein, refers to a subject picture being in consecutive series with another picture within the sequence, without regard to whether the subject picture is before or after the other picture within the video information. A portion of the sequence of pictures, n−2, n−1, n, n+1 and n+2, is shown in FIG. 3. Each picture comprises a two-dimensional array of pixels having coordinates (x,y) from the lower left corner of the picture, where the array function $F(\vec{x},n)$ represents the pixel value at position $$\vec{x} = \begin{pmatrix} x \\ y \end{pmatrix}$$

and field number n within the video information at an initial (lower) spatial resolution. Each picture is logically divided into an array of blocks of pixels $B(\vec{X})$ of a predetermined number of pixels in width and height and having a center $\vec{X}$. The blocks or pixel regions may be rectangular as depicted or may be any other shape.

Block enhancement units 206a–206n within video signal processor 201 enhance the received video information on a per block basis. As noted above, spatial resolution enhancement will be employed to explain the present invention. Specifically, an increase in the spatial resolution of the incoming video by a factor of two in both spatial dimensions of the fields will be employed to describe the present invention.

An initial estimate of higher spatial resolution video information $G(\vec{x},n)$ based on the lower resolution video information $F(\vec{x},n)$ may be initially created by a simple spatial up-conversion—that is, a sample-rate conversion interpolation filter within block enhancement units 206a–206n is employed to obtain a higher resolution image.

The down-conversion operation T( ) which defines down-conversion of the high resolution video information $G(\vec{x},n)$ to low resolution video information $\hat{F}(\vec{x},n)$, given by $\hat{F}(\vec{x},n)=T(G(\vec{x},n))$, is employed in an error criterion for selecting the best enhancement of a given block $B(\vec{X})$. The error criterion, a measure for performance of the enhanced video information $G(\vec{x},n)$, is based on differences between the initial low resolution video information $F(\vec{x},n)$ and the low resolution video information $\hat{F}(\vec{x},n)$ obtained by down-converting the high resolution video information $G(\vec{x},n)$ and is given by:

$$\varepsilon(\vec{C},\vec{X},n) = \sum_{\vec{x}\in B(\vec{X})} |F(\vec{x},n) - \hat{F}(\vec{C},\vec{x},n)| + P_1(\|V\|) + P_2(\vec{C})$$

where $\vec{C}$ is a candidate for the enhancement vector $V=\{v_0, v_1, \ldots, v_m\}$ consisting of coefficients which are utilized to create video information $G(\vec{x},n)$ according to:

$$G(\vec{x},n) = T^{-1}((F(\vec{x},n)) + \sum_{i}^{m}(v_1 W_1(F(\vec{x},n)))).$$

$W_1( )$ within the above equation indicates enhancement of the image data quality (where spatial resolution has already been enhanced by sample-rate conversion) by an algorithm i within a set of algorithms. For example, $W_0(F(\vec{x},n))$ could be the image data after frequency peaking while $W_1(F(\vec{x},n))$ may be the result after luminance transient improvement.

The penalty $P_1$ within the error function given above is a monotonic decreasing function of the norm of the enhancement vector V, introducing a large penalty for small coefficients and a small penalty for large coefficients. The penalty $P_2$ is employed to bias the enhancement vector V towards a spatial-temporally consistent solution since this penalty depends on the selected enhancement vector candidate $\vec{C}$. Accordingly, the value of penalty $P_2$ is selected from a predefined list of penalty values which are optimized for the application.

Each enhancement vector candidate $\vec{C}$ is preferably selected from enhancement vectors previously determined to produce the smallest error function values for blocks within a spatio-temporal neighborhood around the block $B(\vec{X})$ being processed. For example, one reference identified above suggests a "Y-prediction" estimator for recursive search block matching motion estimation, in which spatial prediction vector candidates $\vec{C}_{SP1}$ and $\vec{C}_{SP2}$ are the vectors selected for blocks one block dimension above and to either side of and within the same field as the subject block $B(\vec{X})$ while a temporal prediction candidate $\vec{C}_{TP}$ is the vector selected for a block two blocks directly below and within the previous field n−1 from the field n containing the subject block $B(\vec{X})$. Selection of candidate enhancement vectors from the enhancement vectors which produced optimal results within the spatio-temporal neighborhood of the subject block $B(\vec{X})$ speeds the process of determining the best enhancement (the enhancement vector which produces the smallest error, or other suitable criteria for enhancement results, for the subject block $B(\vec{X})$) since it is very likely that enhancement(s) similar to those producing the best results for other blocks within the neighborhood of the subject block $B(\vec{X})$ will produce the best results for the subject block $B(\vec{X})$.

Alternatively, all possible candidate vectors of enhancement algorithms may be tested for each block. Moreover, the set of candidate vectors employed may change during processing of the video information, with, for example, all possible candidate vectors being tested for the first few fields of the video information and then a smaller subset of candidate vectors being employed for remaining fields, or with the selection of candidate vectors being otherwise refined as the video information is processed. Preferably one candidate is always updated with a random update vector. Several candidates may compete with each other, with the candidate yielding the smallest error $\epsilon(\vec{C}, \vec{X}, n)$ being selected as the enhancement vector for the data within the subject block $B(\vec{X})$.

As a result of the present invention, an enhancement vector which may be utilized with near-optimal results for spatial resolution up-conversion of a particular block is selected on a per-block basis. Spatio-temporal consistency is automatically achieved. Block erosion similar to, but not restricted to, the process disclosed in the references identified above may be employed to prevent blocking artifacts.

Figure 4:
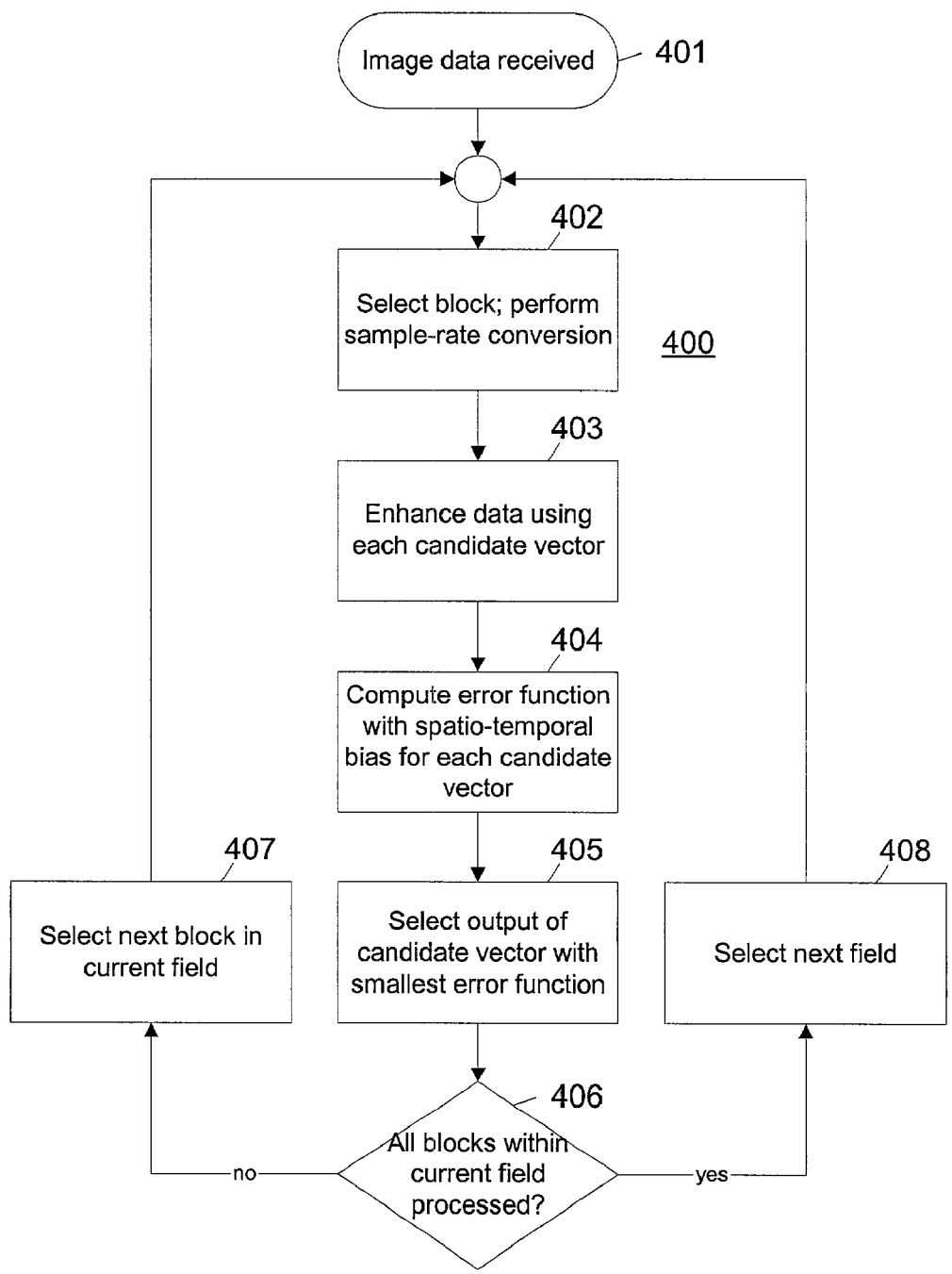
FIG. 4 is a high level flow chart for a process of video enhancement with spatio-temporal consistency according to one embodiment of the present invention.
Figure 5:
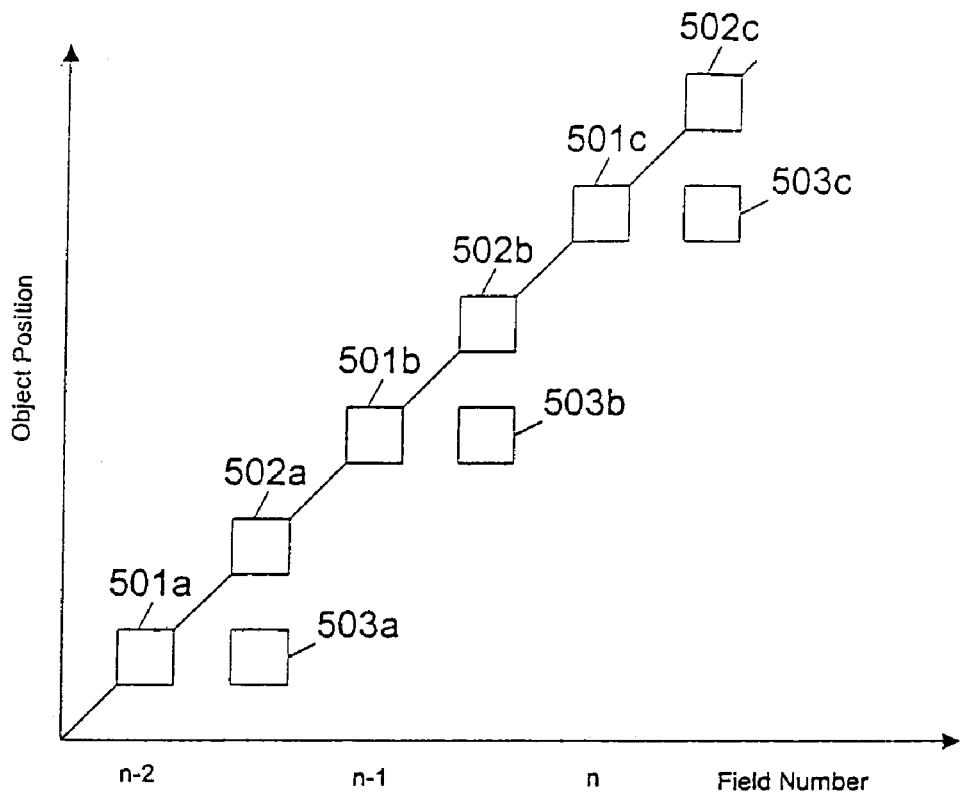
FIG. 5 is an illustration of displacement of a moving object from an expected position as a result of field rate conversion through field repetition.
Figures 6A, 6B:
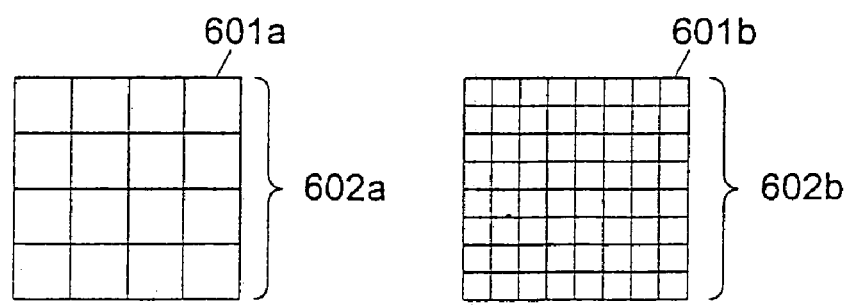
FIGS. 6A and 6B are comparative illustrations for spatial resolution enhancement.

FIG. 4 is a high level flow chart for a process of video enhancement with spatio-temporal consistency according to one embodiment of the present invention. The process 400, performed by the video signal processor 202 depicted in FIG. 2 utilizing the logical organization of video information illustrated in FIG. 3, begins with receipt (step 401) of video information for enhancement. As noted above, the process may be performed for various types of enhancements but spatial resolution enhancement will be employed to describe the process.

A block within a current field of the received video information is first selected (step 402) and a simple enhancement, in this case sample rate conversion, is performed. The block is also enhanced (step 403) utilizing each of a plurality of selected candidate enhancement vectors consisting one or more enhancement algorithms employed jointly or individually, such as frequency peaking and luminance transient improvement.

An error function value, where the error function includes a bias towards spatio-temporal consistency, is then computed for each candidate enhancement vector (step 404) and the enhancement corresponding to the candidate vector having the lowest error function value is selected (step 405) for display as part of the enhanced field.

A determination as to whether all blocks within the current field have been processed (step 406) is then made, followed by selection and processing of a next block within the current field (step 407) if additional blocks remain and initiation of processing on the next field (step 408) if the current field has been completely processed. Once initiated, the process proceeds until interrupted by an external influence, such as the receiver being turned off or the reception of video information being interrupted.

The present invention allows enhancements to video information (other than position within a repeated field) to be processed in a manner inherently producing spatio-temporally consistent results. The error function employed to select the best enhancement vector of enhancement algorithms is biased towards spatio-temporal consistency by addition of a penalty increasing as candidate vectors differ from a block being enhanced by either space, time, or both. As a result, the selected enhancement produces changes which are gradual over space and time and inherently free of spatio-temporal varying artifacts.

It is important to note that while the present invention has been described in the context of a fully functional hard-ware based system and/or network, those skilled in the art will appreciate that the mechanism of the present invention is capable of being distributed in the form of a machine usable medium containing instructions in a variety of forms, and that the present invention applied equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions and alterations herein may be made without departing from the spirit and scope of the invention in its broadest form.

What is claimed is:

1. A receiver, including a video enhancement mechanism for enhancing video information with spatio-temporal consistency, comprising:
    at least one enhancement unit enhancing a characteristic other than position of a selected pixel region of video information utilizing at least one candidate enhancement vector of enhancement algorithms to generate an enhanced pixel region for each candidate enhancement vector, each said enhanced pixel region equivalent to enhancement of said selected pixel region utilizing a respective candidate enhancement vector of enhancement algorithms; and
    a selection unit computing an error for each said enhanced pixel region utilizing a bias towards spatio-temporal consistency of a respective enhanced pixel region with spatially adjacent pixel regions in a picture containing said selected pixel region and with a counterpart pixel region in one or more pictures successive with said picture containing said selected pixel region, said selection unit selecting an enhanced pixel region having a best enhancement for spatio-temporal consistency.

2. A receiver as set forth in claim 1 wherein said at least one candidate enhancement vector is selected from enhancement vectors determined to produce a best enhancement for spatio-temporal consistency in enhancing pixel regions within a spatial and temporal neighborhood of said selected pixel region.

3. A receiver as set forth in claim 1 wherein said bias towards spatio-temporal consistency further comprises first and second penalties, said first penalty varying based upon coefficients for each candidate enhancement vector and said second penalty varying for each candidate enhancement vector.

4. A receiver as set forth in claim 3 wherein said error is computed on a per-pixel region basis for each pixel region within said video information and for each candidate enhancement vector for a respective pixel region.

5. A high definition television receiver comprising:
    a input connection receiving video information;
    a display on which enhanced images derived from said video information are displayed; and
    an video enhancement mechanism for enhancing said video information with spatio-temporal consistency comprising:
    at least one enhancement unit enhancing a characteristic other than position of a selected pixel region of video information utilizing at least one candidate enhancement vector of enhancement algorithms to generate an enhanced pixel region for each candidate enhancement vector, each said enhanced pixel region equivalent to enhancement of said selected pixel region utilizing a respective candidate enhancement vector of enhancement algorithms; and a selection unit computing an error for each said enhanced pixel region utilizing a bias towards spatio-temporal consistency of a respective enhanced pixel region with spatially adjacent pixel regions in a picture containing said selected pixel region and with a counterpart pixel region in one or more pictures successive with said picture containing said selected pixel region, said selection unit selecting an enhanced pixel region having a best enhancement for spatio-temporal consistency.

6. The receiver as set forth in claim 5 wherein said at least one candidate enhancement vector of enhancement algorithms is selected from enhancement vectors determined to produce a best enhancement for spatio-temporal consistency in enhancing pixel regions within a spatial and temporal neighborhood of said selected pixel region.

7. The receiver as set forth in claim 5 wherein said bias towards spatio-temporal consistency further comprises first and second penalties, said first penalty varying based upon coefficients for each candidate enhancement vector and said second penalty varying for each candidate enhancement vector.

8. The receiver as set forth in claim 6 wherein said error is computed on a per-pixel region basis for each pixel region within said video information and for each candidate enhancement vector for a respective pixel region.

9. For use in a receiver, a method of enhancing video information with spatio-temporal consistency comprising:

enhancing a characteristic other than position of a selected pixel region of video information utilizing at least one candidate enhancement vector of enhancement algorithms to generate an enhanced pixel region for each candidate enhancement vector, each enhanced pixel region equivalent to enhancement of the selected pixel region utilizing a respective candidate enhancement vector of enhancement algorithms;

computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region; and selecting an enhanced pixel region having a best enhancement for spatio-temporal consistency.

10. The method as set forth in claim 9 wherein the step of enhancing a characteristic other than position of a selected pixel region of video information utilizing at least one candidate enhancement vector of enhancement algorithms to generate an enhanced pixel region for each candidate enhancement vector further comprises:

selecting the at least one candidate enhancement vector of enhancement algorithms from enhancement vectors determined to produce a best enhancement for spatio-temporal consistency in enhancing pixel regions within a spatial and temporal neighborhood of the selected pixel region.

11. The method as set forth in claim 9 wherein the step of computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region further comprises:

adding first and second penalties to the error as the bias, the first penalty varying based upon coefficients for each candidate enhancement vector and the second penalty varying for each candidate enhancement vector.

12. The method as set forth in claim 11 wherein the step of computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region further comprises:

computing the error on a per-pixel region basis for each pixel region within the video information and for each candidate enhancement vector for a respective pixel region.

13. A computer program product within a computer readable medium for enhancing video information with spatio-temporal consistency comprising:

instructions for enhancing a characteristic other than position of a selected pixel region of video information utilizing at least one candidate enhancement vector of enhancement algorithms to generate an enhanced pixel region for each candidate enhancement vector, each enhanced pixel region equivalent to enhancement of the selected pixel region utilizing a respective candidate enhancement vector of enhancement algorithms;

instructions for computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region; and instructions for selecting an enhanced pixel region having a best enhancement for spatio-temporal consistency.

14. The computer program product as set forth in claim 13 wherein the instructions for enhancing a characteristic other than position of a selected pixel region of video information utilizing at least one candidate enhancement vector of enhancement algorithms to generate an enhanced pixel region for each candidate enhancement vector further comprise:

instructions for selecting the at least one candidate enhancement vector of enhancement algorithms from enhancement vectors determined to produce a best enhancement for spatio-temporal consistency in enhancing pixel regions within a spatial and temporal neighborhood of the selected pixel region.

15. The computer program product as set forth in claim 14 wherein the instructions for computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region further comprise:

instructions for adding first and second penalties to the error as the bias, the first penalty varying based upon coefficients for each candidate enhancement vector and the second penalty varying for each candidate enhancement vector.

16. The computer program product as set forth in claim 15 wherein the instructions for computing an error for each enhanced pixel region utilizing a bias towards spatio-temporal consistency of a respective enhanced pixel region with spatially adjacent pixel regions in a picture containing the selected pixel region and with a counterpart pixel region in one or more pictures successive with the picture containing the selected pixel region further comprise:

instructions for computing the error on a per-pixel region basis for each pixel region within the video information and for each candidate enhancement vector for a respective pixel region.

17. A video information signal comprising:
a data stream containing one or more pictures; and
at least one enhanced pixel region within at least one of said pictures, each enhanced pixel region derived from received video information by enhancing a characteristic other than position of a selected pixel region of said received video information utilizing at least one candidate enhancement vector of enhancement algorithms to generate a candidate enhanced pixel region for each candidate enhancement vector, each candidate enhanced pixel region equivalent to enhancement of said selected pixel region utilizing a respective candidate enhancement vector of enhancement algorithms,
wherein each enhanced pixel region within a respective picture has a best enhancement for spatio-temporal consistency among said candidate enhanced pixel regions for an error utilizing a bias towards spatio-temporal consistency of said respective enhanced pixel region with spatially adjacent pixel regions in a picture containing said selected pixel region and with a counterpart pixel region in one or more pictures successive with said picture containing said selected pixel region.

18. The video information signal as set forth in claim 17 wherein said at least one candidate enhancement vector is selected from enhancement vectors determined to produce a smallest computed error value in enhancing pixel regions within a spatial and temporal neighborhood of said selected pixel region.

19. The video information signal as set forth in claim 17 wherein said bias towards spatio-temporal consistency comprises first and second penalties, said first penalty varying based upon coefficients for each candidate enhancement vector and said second penalty varying for each candidate enhancement vector.

20. The video information signal as set forth in claim 19 wherein each said enhanced pixel region within any picture is selected utilizing said error computed on a per-pixel region basis for each pixel region within said received video information and for each candidate enhancement vector for a respective pixel region.

* * * * *